US010388970B2

(12) United States Patent
Van Doorn

(10) Patent No.: US 10,388,970 B2
(45) Date of Patent: Aug. 20, 2019

(54) METHOD FOR OPERATING A FUEL CELL SYSTEM

(71) Applicant: AUDI AG, Ingolstadt (DE)

(72) Inventor: René Van Doorn, Obersulm-Willsbach (DE)

(73) Assignee: AUDI AG, Ingolstadt (DE)

(*) Notice: Subject to any disclaimer, the term of this patent is extended or adjusted under 35 U.S.C. 154(b) by 780 days.

(21) Appl. No.: 14/652,219

(22) PCT Filed: Aug. 2, 2013

(86) PCT No.: PCT/EP2013/002317
§ 371 (c)(1),
(2) Date: Jun. 15, 2015

(87) PCT Pub. No.: WO2014/094923
PCT Pub. Date: Jun. 26, 2014

(65) Prior Publication Data
US 2015/0325865 A1    Nov. 12, 2015

(30) Foreign Application Priority Data
Dec. 19, 2012  (DE) .......... 10 2012 024 860

(51) Int. Cl.
H01M 8/00       (2016.01)
H01M 8/04029    (2016.01)
H01M 8/04955    (2016.01)
H01M 8/04007    (2016.01)
H01M 8/04119    (2016.01)
H01M 8/04537    (2016.01)
(Continued)

(52) U.S. Cl.
CPC ......... H01M 8/04029 (2013.01); B60L 58/33 (2019.02); H01M 8/04059 (2013.01);
(Continued)

(58) Field of Classification Search
CPC ............. H01M 8/00; H01M 8/04059; H01M 8/04029; H01M 8/04619; H01M 8/04955;
(Continued)

(56) References Cited

U.S. PATENT DOCUMENTS 5,925,476 A    7/1999  Kawatsu
6,815,106 B1   11/2004 Salvador et al.
(Continued)

FOREIGN PATENT DOCUMENTS

CN    1340221 A    3/2002
CN    1463474 A    12/2003
(Continued)

OTHER PUBLICATIONS

German Office Action for German Priority Patent Application No. 10 2012 024 860.1, dated Apr. 18, 2013, 6 pages.
(Continued)

Primary Examiner — Nicholas P D'Aniello
(74) Attorney, Agent, or Firm — Staas & Halsey LLP

(57) ABSTRACT

A method operates a fuel cell system of a motor vehicle, which fuel cell system has at least one fuel cell. The fuel cell system is assigned a water cooling circuit having a heat exchanger and a water store. The motor vehicle is assigned a cooling circuit having a conveying device for conveying a cooling medium, which is supplied to the heat exchanger of the water cooling circuit. The heat exchanger is used to condense water from cathode waste gas of the at least one fuel cell and store it in the water store. The at least one fuel cell is cooled with water from the water store. The conveying device of the cooling circuit is operated depending on a water level in the water store.

15 Claims, 1 Drawing Sheet

(51) Int. Cl.
*B60L 58/33* (2019.01)
*H01M 8/04828* (2016.01)
*H01M 8/04044* (2016.01)
*H01M 8/04492* (2016.01)

(52) U.S. Cl.
CPC ... *H01M 8/04164* (2013.01); *H01M 8/04619* (2013.01); *H01M 8/04955* (2013.01); *H01M 8/04044* (2013.01); *H01M 8/04492* (2013.01); *H01M 8/04828* (2013.01); *H01M 2250/20* (2013.01); *Y02T 90/32* (2013.01)

(58) Field of Classification Search
CPC ......... H01M 8/04164; H01M 8/04492; H01M 8/04044; H01M 8/04828; H01M 2250/20; Y02E 60/50; B60L 11/1892; Y02T 90/32
See application file for complete search history.

(56) References Cited

U.S. PATENT DOCUMENTS

2003/0029650 A1  2/2003  Baumert et al.
2008/0038610 A1  2/2008  Darling
2013/0252118 A1  9/2013  Otto
2014/0113207 A9  4/2014  Otto

FOREIGN PATENT DOCUMENTS

| | | |
|---|---|---|
| DE | 10118151 | 12/2001 |
| DE | 69708422 | 5/2002 |
| DE | 112005003309 | 12/2007 |
| DE | 102010052839 | 5/2012 |
| DE | 10 2012 024 860.1 | 12/2012 |
| JP | 2000-30727 | 1/2000 |
| JP | 2002-280046 | 9/2002 |
| WO | 2011/149458 | 12/2011 |
| WO | PCT/EP2013/002317 | 8/2013 |

OTHER PUBLICATIONS

English language International Search Report for PCT/EP2013/002317, dated Oct. 28, 2013, 2 pages.
Office Action dated Mar. 4, 2016 in Chinese Patent Application No. 201380034636.1.
WIPO English Language Translation of the Written Opinion for PCT/EP2013/002317, downloaded from WIPO website on Oct. 16, 2015, 6 pages.

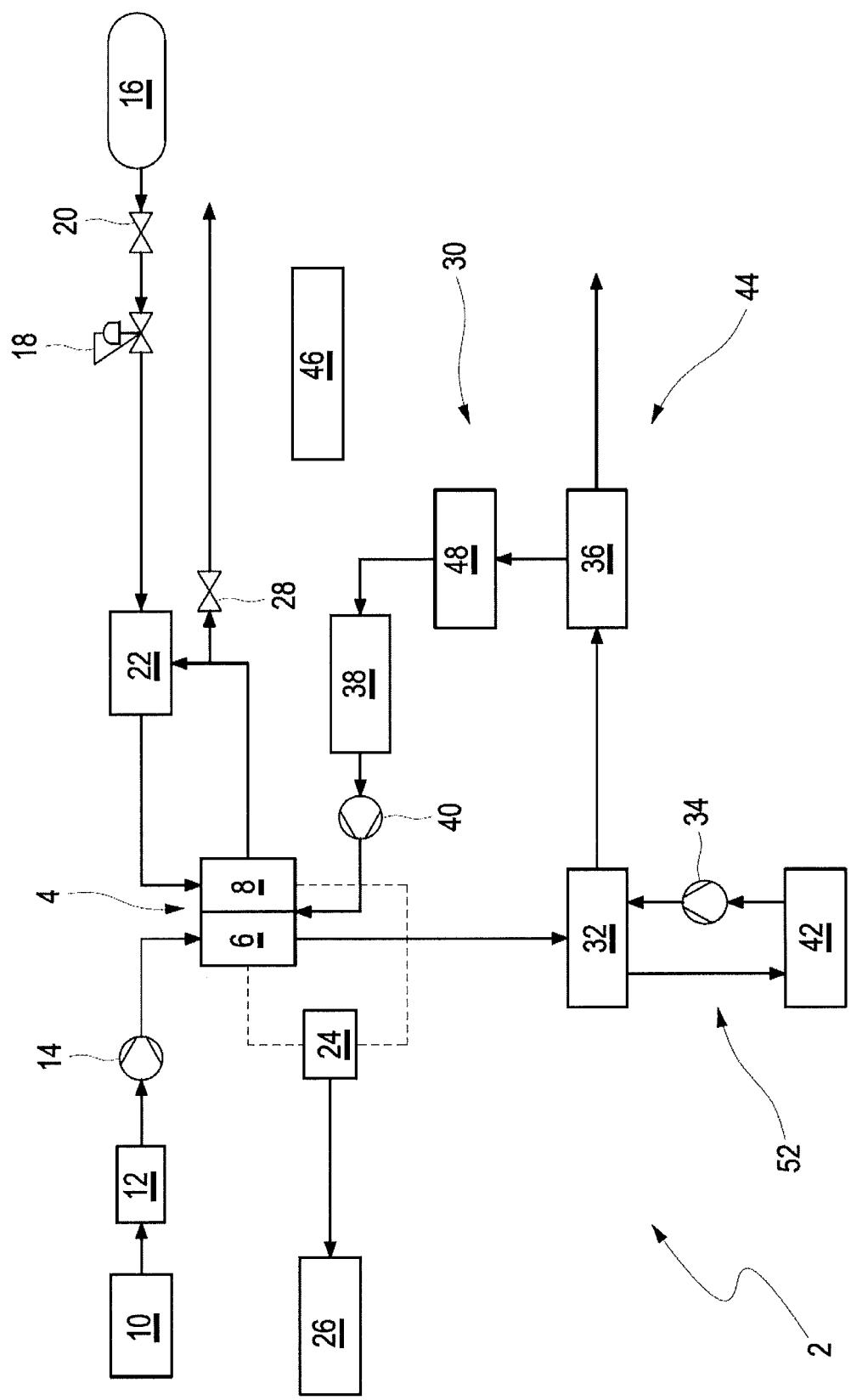

METHOD FOR OPERATING A FUEL CELL SYSTEM

CROSS REFERENCE TO RELATED APPLICATIONS

This application is based on and hereby claims priority to International Application No. PCT/EP2013/002317 filed on Aug. 2, 2013 and German Application No. 10 2012 024 860.1 filed on Dec. 19, 2012, the contents of which are hereby incorporated by reference.

BACKGROUND

The invention relates to a method and an arrangement for the operation of a fuel cell system.

A method for the control of a fuel cell system with a fuel cell is known from the publication DE 10 118 151 A1 The fuel cell comprises an anode outlet that discharges hydrogen-containing anode waste gas and a cathode outlet that discharges an oxygen-containing cathode waste gas, a hydrogen source for supplying hydrogen to an anode of the fuel cell and an air compressor for supplying oxygen to a cathode of the fuel cell. Furthermore, a modulatable pressure controller for altering the counter pressure of the cathode waste gas at the cathode outlet is provided here. Moreover, the surroundings of the fuel cell system are detected and a signal regarding the surroundings is sent to a controller. At least one operating state of the system is detected and a signal that indicates the same is sent to the controller. The controller is modulated by the controller in response to the signals for optimizing the power of the system in the surroundings.

A fuel cell generator that uses fuel cells that take up a delivery quantity of a reaction gas that is fed to an electrode with a catalyst disposed thereon in order to produce an electromotive force by a chemical reaction of the reaction gas is disclosed in the publication DE 697 08 422 T2. The fuel cell generator comprises a power degradation detection device for detecting a power degradation of the fuel cells, and a toxic condition detection device for detecting a toxic condition of the catalyst. A temperature control device is adapted here to increase the temperature of the fuel cells if the toxic condition detection device detects the toxic condition of the catalyst and the power degradation detection device detects a power degradation of the fuel cells. A gas pressure control device is adapted to control the pressure of reaction gas that is fed to an electrode in response to the temperature control by the temperature control device so that the partial vapor pressure of the reaction gas is kept within a predetermined range.

In the publication DE 10 2010 052 839 A1 it is disclosed that a fuel cell system can be used for generating energy and for generating water on board a vehicle. In order to reduce the total weight of the fuel cell system, a fuel cell is controlled or regulated depending on a current level or a limit level of the water tank and of a forecast future water consumption. This enables the water quantity to be stored in the water tank to be minimized.

SUMMARY

The inventor proposes a method for the operation of a fuel cell system of a motor vehicle. The fuel cell system comprises at least one fuel cell here, wherein a water circuit with a heat exchanger and a water reservoir is associated with the fuel cell system. Moreover, a cooling circuit with a transport device for transporting a coolant, which is fed to the heat exchanger of the water circuit, is associated with the motor vehicle. Water is condensed by the heat exchanger from cathode waste gas of the at least one fuel cell and is stored in the water reservoir, wherein the at least one fuel cell is cooled with water from the water reservoir. With the proposed method the transport device is operated depending on a level of the water in the water reservoir.

The inventor also proposes an arrangement for the operation of a fuel cell system of a motor vehicle. The fuel cell system comprises at least one fuel cell here, wherein a water circuit with a heat exchanger and a water reservoir is associated with the fuel cell system. Furthermore, it is provided that the water reservoir is also in the form of a component of the arrangement. Moreover, a cooling circuit with a transport device for transporting a coolant that is to be fed to the heat exchanger of the water circuit is associated with the motor vehicle, wherein water is condensed by the heat exchanger from cathode waste gas of the at least one fuel cell and is stored in the water reservoir. The at least one fuel cell is cooled with water from the water reservoir. The transport device of the coolant circuit is to be operated depending on the level of the water in the water reservoir.

In addition, it is possible to operate the transport device of the coolant circuit depending on a load region of the at least one fuel cell and/or depending on the power of the motor vehicle. Consequently, the transport device of the coolant circuit can be turned on or off depending on the level of the water reservoir and/or on the load region. Liquid water is only fed to the water reservoir if the transport device of the coolant circuit is turned on and being operated.

Fuel cells are designed to convert hydrogen and oxygen from the air into water and electricity with high efficiency. With the proposed method and arrangement, additional cooling is implemented for a fuel cell system comprising at least one fuel cell.

Despite high efficiency of more than 50% in almost all power ranges, when operating the fuel cell a significant amount of heat still occurs that has to be dissipated from the fuel cell. There are two different known cooling concepts for cooling a stack of fuel cells. With a first of said cooling concepts a classic cooling arrangement with an internal heat exchanger is implemented.

With a second cooling concept on which the proposals are based, evaporation cooling of water from the water reservoir is utilized.

In order to implement the proposed system, it is provided to associate with the fuel cell system the water reservoir for water that is to be used as cooling water and e.g. to install the same in the fuel cell system, normally in the water circuit of the fuel cell system. Said water reservoir is usually in the form of a water container or water tank with a volumetric capacity of a few liters, generally a single-digit number of liters, e.g. of 5 liters. In general a volume of the water reservoir is to be selected for a number and/or size of the fuel cells to be cooled.

The arrangement, which in one possible embodiment comprises the fuel cell system, the water circuit and possibly the cooling circuit of the motor vehicle, is operated so that the provided water reservoir is usually almost full. The water reservoir can be in the form of a component of the water circuit here. For this purpose it is taken into account that when operating the at least one fuel cell sometimes more water, i.e. product water, is condensed than is necessary for an even water balance. The fuel cell system usually comprises a water circuit that is in general already present, which is used for cooling the fuel cells, and the water reservoir.

Said water circuit comprises a heat exchanger in the form of a condenser, which is designed to liquefy gaseous water from a cathode waste gas of the at least one fuel cell by condensation. The coolant in the cooling circuit, which is fed to the heat exchanger of the water circuit, is used for cooling the gaseous water to be liquefied, which circulates in the water circuit and/or can be stored in the water reservoir. During this, a delivered quantity of the coolant used for cooling the water is adjusted depending on the power of the at least one fuel cell by a controller, i.e. by control and/or regulation of the operation of the transport device of the coolant circuit.

If an operating point is reached at which the cooling usually provided with water by the water circuit is not sufficient, water is taken from the water reservoir until its contents have reached a certain, possibly operating point-dependent, lower limit of e.g. 1 liter of remaining water, so that a quantity of the water in the water reservoir is not less than an intended minimum value. As long as the at least one fuel cell is being cooled by water from the water reservoir, the fuel cell system can be operated with an intended power level. Only if the intended minimum value for the quantity of remaining water in the water reservoir is reached is it provided to reduce the power of the fuel cell system for cooling, because cooling is now no longer possible with the water from the water reservoir.

For cooling the fuel cell system with a power level of 100 kW, e.g. a quantity of water with a flow rate of about 35 ml/s is required. If the fuel cell system is operated with a power level of 75 kW, only a quantity with a flow rate of 23 ml/s is required for this. If the water circuit is only capable of providing water with a flow rate of 23 ml/s for cooling, then taking into account the difference of the flow rates of 12 ml/s and the above-mentioned quantity of water available from the water reservoir, e.g. 4 liters, the motor vehicle to be supplied with energy by the fuel cell system can be driven over a time period of approx. 5½ minutes with a power level of 100 kW instead of only 75 kW. Thus water flowing through the water circuit is usually used for the cooling of the at least one fuel cell, wherein a cooling power depends on a quantity and/or speed of the water flowing through the water circuit. The water from the water reservoir can be used for the additional cooling of the at least one fuel cell depending on the operating point-dependent power of the at least one fuel cell, wherein a cooling power to be provided depends here on the quantity and/or speed of the water provided from the water reservoir by the transport device of the water circuit.

The arrangement and/or the method is or are suitable inter alia for the operation of fuel cell systems of higher power classes. Here it is possible to effectively dissipate the operationally produced heat at a certain power level of the at least one fuel cell, especially in high ambient temperatures, for the fuel cell system in the motor vehicle for a temperature level of the at least one fuel cell of about 80° C. during operation. In designing the arrangement and/or the method it is taken into account that higher powers are not called for permanently but, usually only for driving the motor vehicle during transient operating states of the motor vehicle, such as e.g. during acceleration or ascents when increased force is required.

With the arrangement and/or the method, the overall efficiency of the motor vehicle can be improved by the cooling now provided. Thus usually in a low or lowest load point region a percentage proportion of the drive energy for the operation of the transport device of the coolant circuit for transporting the coolant is high. This can mean that in the lower load point region a power level of 300 to 400 Watts is necessary for this, whereby the overall efficiency reduces. The water reservoir is thereby driven into deficit over a certain time interval, which means in this case that a quantity of water stored therein corresponds to the minimum for the lower limit provided for this purpose, and the water reservoir is not being filled because the transport device of the coolant circuit is turned off and consequently no water is condensed from the cathode waste gas by the heat exchanger. The water reservoir is only re-filled with water subsequently. For this purpose, the transport device of the coolant circuit is turned on again, wherein the transport device again transports coolant to the heat exchanger, whereby water is again condensed from the cathode waste gas and fed to the water reservoir. The consumption of the transport device rises disproportionately to its transport rate during this. Thus the overall efficiency over the journey time is better than for the case in which the transport device of the coolant circuit is always turned on for transporting water to the thermal reservoir. Thus in an embodiment of the arrangement and/or the method the transport device of the coolant circuit is only operated intermittently, i.e. with interruptions or pauses.

It is understood that the previously mentioned features and the features yet to be explained below can be used not only in the respectively stated combination, but also in other combinations or on their own without departing from the scope.

BRIEF DESCRIPTION OF THE DRAWINGS

These and other objects and advantages of the present invention will become more apparent and more readily appreciated from the following description of the preferred embodiments, taken in conjunction with the accompanying drawing:

FIG. 1 shows a potential embodiment of a proposed arrangement and an example of a fuel cell system in a schematic illustration.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The example of a fuel cell system 2 for a motor vehicle schematically illustrated in FIG. 1 comprises at least one fuel cell 4, which in turn comprises a cathode 6 and an anode 8.

During the operation of the fuel cell system 2, air from the surroundings is filtered by an air filter 10, is quantitatively and/or qualitatively analyzed by an air mass sensor 12 in the form of a hot film anemometer (HFA), is compressed by a transport unit 14, in this case e.g. by a compressor, and fed to the cathode 6 of the at least one fuel cell 4.

Moreover, hydrogen is fed from a hydrogen reservoir 16 provided for this purpose by two valve devices 18, 20 to a recycling unit 22 for the recycling or re-use of hydrogen. Starting from the recycling unit 22, the hydrogen is fed to the anode 8 of the at least one fuel cell 4.

In the at least one fuel cell 4 oxygen from the air reacts with the hydrogen to form water and electricity, which is distributed by a power distribution unit 24 (PDU) to at least one consuming device 26 in the motor vehicle, such as e.g. a drive train.

Hydrogen that is not required during a reaction in the at least one fuel cell 4 can be fed back to the recycling unit 22 or can be discharged from the fuel cell system 2 to the surroundings by a valve 28.

Moreover, the fuel cell system 2 comprises a water circuit 30 connected to the at least one fuel cell 2, which in this case comprises a heat exchanger 32 in the form of a condenser, a water separator 36, a water reservoir 48, a deionization filter 38 and a transport device 40 in the form of a pump, which are disposed one after the other according to the described order. The positions of the water reservoir 48 and of the deionization filter 38 within the water circuit 30 can be exchanged here.

A cooling circuit 52 is also associated with the motor vehicle, comprising at least one cooling module 42 in the form of a vehicle radiator in this case and a transport device 34 in the form of an electrical circulation pump in this case, with which a coolant is to be transported through the cooling circuit 52. The cooling circuit is connected to the heat exchanger 32 of the water circuit 30.

During the operation of the water circuit 30, liquid, deionized water from porous bipolar plates (not shown here) of the deionization filter 38 is injected by the transport device 40 into the at least one fuel cell 4, in which it evaporates, wherein the at least one fuel cell 4 is cooled with a heat of vaporization of about 42 kJ per 18 g of water. The water evaporated in the at least one fuel cell 4 during cooling is discharged as cathode waste gas by a corresponding outlet of the cathode 6 together with so-called product water, i.e. water arising during the reaction in the at least one fuel cell 4, likewise an excess of oxygen and inert nitrogen from the air.

Consequently, with the method water from the at least one fuel cell 4 is transferred into the water circuit 30. This can be water that arises during a reaction in the at least one fuel cell 4. Alternatively or in addition, it is water that is fed from the water circuit 30 for normal cooling and/or from the water reservoir 48 of the at least one fuel cell 4 for additional cooling depending on the operating point.

Here water from the at least one fuel cell 4 is first fed to the heat exchanger 32 of the water circuit 30, in which the water is condensed, then to the water separator 36 of the water circuit 30, in which gas is removed from the water, to the water reservoir 48, to a deionization filter 38 of the water circuit 30, in which the water is deionized, and to a transport device 40 of the water circuit 30. It is thereby possible to store a defined quantity of water in the water reservoir 48.

In order to provide a closed water circuit 30 so that no water has to be replenished by the customer, in this case the cathode waste gas is fed to the heat exchanger 32 in the form of saturated exhaust air, in general gaseous water, and inert nitrogen with a residue of oxygen. If the transport device 34 of the coolant circuit 52 is turned on and thus the coolant is being transported through the heat exchanger 32, water is condensed or liquefied from the cathode waste gas. Said liquid water is separated in the water separator 36 from the gaseous components, which are then discharged into the surroundings. The water is then stored in the water reservoir 48. Following deionization, water can be fed back to the at least one fuel cell 4 by the second transport device 40. Consequently, the fuel cell system 2 is temperature-controlled here by evaporation cooling.

The embodiment of the arrangement 44 shown here comprises a controller 46 that is designed to manage at least one part of the proposed method, i.e. to control and/or to regulate the same. Furthermore, the controller 46 is designed to manage and consequently to control and/or to regulate common functions of the fuel cell system 2 independently of the method.

Moreover, the arrangement 44 comprises as a component the water reservoir 48, which is disposed in the water circuit 30 and in this case is in the form of a water container, e.g. of a water tank. Water that is stored in said water reservoir 48 is to be transported from the water reservoir 48 and thus delivered by the transport device 40 of the water circuit 30 for the cooling of the at least one fuel cell 4.

The method is carried out with the presented arrangement 44, wherein at least one part of the method is to be controlled with the controller 46 of the arrangement 44.

With the method for the operation of the fuel cell system 2, the coolant from the cooling circuit 52 is fed to the heat exchanger 32 of the water circuit 30 by the transport device 34 of the coolant circuit 52, wherein water is condensed from cathode waste gas of the at least one fuel cell 4 by the heat exchanger 32 and it is stored in the water reservoir 48, wherein the at least one fuel cell 4 is cooled with water from the water reservoir 48. The transport device 34 of the coolant circuit 52 is operated depending on the level of the water in the water reservoir 48.

In an embodiment, the water is transported by a transport device 40 of the water circuit 30 from the water reservoir 48 into the at least one fuel cell 4, as long as there is a minimum amount of water in the water reservoir 48.

Furthermore, it can be provided that the transport device 34 of the coolant circuit 52 is turned on and being operated if the fuel cell system 2 is being operated in a high load region, wherein water is condensed by the heat exchanger 32 and is transported into the water reservoir 48. The transport device 34 of the coolant circuit 52 is turned off if the fuel cell system 2 is being operated in a low load region. Consequently, the transport device 34 of the coolant circuit 52 can additionally be operated depending on the load region of the fuel cell system 2.

The transport device 34 of the coolant circuit 52 that is turned off in the low load region of the fuel cell system 2 is turned on and operated again once the level of the water in the water reservoir 48 has reached a minimum value.

Moreover, the transport device 34 of the coolant circuit 52, after being turned on in the low load region of the fuel cell system 2, is operated until the level in the water reservoir 48 again has a defined minimum value and is then turned off again.

The at least one fuel cell 4 is usually cooled with water that is stored in the water reservoir 48 if the motor vehicle is in a transient operating state in which the power of the motor vehicle is increased. In an embodiment this means that the at least one fuel cell 4 is cooled with water that is stored in the water reservoir 48 if the motor vehicle is accelerating and/or travelling up a gradient.

The at least one fuel cell 4 can be cooled with water that is stored in the water reservoir 48 until the amount of water in the water reservoir 48 has reached a minimum that it is not intended to fall below.

It is also provided that the water reservoir 48 is operated in deficit in a low load region if the quantity of the water in the water reservoir 48 has the provided minimum value, wherein the quantity of water is not increased in the low load region. In this case the transport device 34 of the coolant circuit 52 is turned off, whereby no water is condensed from the cathode waste gas in the heat exchanger 32. Thus water is taken from the water reservoir 48 when operating in deficit, but no new water is fed in.

The water reservoir 48 comprises a certain volume, e.g. 5 liters. In this case as much water from the water reservoir 48 is transported by the transport device 40 as is required for the cooling of the at least one fuel cell 4.

Water used for the cooling of the at least one fuel cell 4 is taken as a component of saturated cathode waste gas from the at least one fuel cell 4, which can also contain air and thus nitrogen and oxygen, and is condensed by the heat exchanger 32 using the coolant in the cooling circuit that is transported by the transport device 34.

Heat that arises in the heat exchanger 32 during the condensation carried out for cooling the water from the at least one fuel cell 4 is transferred to the coolant in the cooling circuit 52 associated with the motor vehicle, e.g. water ethylene glycol (WEG), and is discharged to the surroundings in the at least one cooling module 42. Circulation of said coolant in the cooling circuit 52 is carried out by a transport device 34 in the form of an electrical circulation pump. The discharge of heat from the water circuit 30 can be regulated by managing or controlling and/or regulating the controllable transport device 34. Furthermore, the quantity of liquid water arising during the condensation of the cathode waste gas can also be regulated in this way depending on the temperature of the coolant, whereby in turn a fill level or water level in the water reservoir 48 can be regulated and thus adjusted by turning the transport device 34 of the coolant circuit 52 on and off.

A relatively small quantity of water is required for cooling the at least one fuel cell 4, especially in its lower and medium power regions. Moreover, it is considered that the transport device 34 of the coolant circuit 52 has relatively high consumption. In an embodiment of the invention it is provided that said transport device 34 is not operated until reaching a minimum water level of e.g. 1 liter in the water reservoir 48. Said minimum water level is reached starting from a higher water level if the water that is used for the cooling of the at least one fuel cell 4 is taken from the water reservoir 48. If said minimum water level is reached, then the initially turned off transport device 34 is turned on and is operated again, possibly with a higher throughput. The result of this is that more water arises during the condensation of the cathode waste gas by the heat exchanger 32 than is required for the operation of the fuel cell 4, whereby the water level in the water reservoir 48 rises in turn. Because the extra electrical consumption by the transport device 34 at said operating point is less than the electrical consumption would be under minimum load, the efficiency of the fuel cell system 2 calculated during this operating period is improved.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for operating a fuel cell system of a motor vehicle comprising at least one fuel cell, a water circuit including a first heat exchanger, a water reservoir, a first conduit to transport water from the first heat exchanger to the at least one fuel cell and a second conduit to transport cathode waste gas from the at least one fuel cell to the first heat exchanger, the motor vehicle further comprising a coolant circuit including a second heat exchanger and a transport device to circulate a coolant between the second heat exchanger and the first heat exchanger, the method comprising:

condensing, by the first heat exchanger, water from the cathode waste gas of the at least one fuel cell, the water being condensed by cooling provided by the coolant of the coolant circuit;

storing water condensed by the first heat exchanger in the water reservoir;

cooling the at least one fuel cell with water from the water reservoir, the water being transported from the water reservoir to the at least one fuel cell by the first conduit; and selectively activating the transport device of the coolant circuit to selectively transport the coolant to feed the first heat exchanger, depending on a level of water in the water reservoir, wherein when the transport device of the coolant circuit is transporting the coolant to feed the first heat exchanger, the method further comprises adjusting a quantity of coolant fed to the first heat exchanger according to a power level of the at least one fuel cell.

2. The method as claimed in claim 1, further comprising:

transporting, by a transport device of the water circuit, water from the water reservoir into the at least one fuel cell, as long as there is at least a predetermined amount of water in the water reservoir.

3. The method as claimed in claim 1, further comprising:

removing gas from the water condensed by the first heat exchanger, by a water separator of the water circuit;

deionizing, by a deionization filter of the water circuit, water from which gas has been removed by the water separator; and feeding water deionized by the deionization filter to a transport device of the water circuit.

4. The method as claimed in claim 1, wherein selectively activating the transport device of the coolant circuit comprises:

activating the transport device of the coolant circuit when the fuel cell system is being operated in a high load region, so that water is condensed by the first heat exchanger and then transported into the water reservoir.

5. The method as claimed in claim 1, further comprising:

separating, by a water separator, the water condensed by the first heat exchanger before storing the water in the water reservoir.

6. The method as claimed in claim 1, wherein selectively activating the transport device of the coolant circuit comprises:

deactivating the transport device of the coolant circuit when the fuel cell system is being operated in a low load region.

7. The method as claimed in claim 6, wherein after the transport device of the coolant circuit has been deactivated when the fuel cell system is operated in the low load region, the method further comprises activating the transport device of the coolant circuit when the level of water in the water reservoir is determined to be below a predetermined minimum value.

8. The method as claimed in claim 7, wherein the transport device of the coolant circuit is activated in the low load region when the level of water in the water reservoir is determined to be below the predetermined minimum value, and after the transport device of the coolant circuit is activated in the low load region, the transport device of the coolant circuit remains activated until the level of water in the water reservoir is determined to be equal to or greater than the predetermined minimum value.

9. The method as claimed in claim 1, wherein selectively activating the transport device of the coolant circuit comprises:
activating and deactivating the transport device of the coolant circuit according to a load region of the at least one fuel cell.

10. The method as claimed in claim 1, wherein selectively activating the transport device of the coolant circuit comprises:
activating and deactivating the transport device of the coolant circuit according to a power production level of the at least one fuel cell.

11. The method as claimed in claim 1, wherein selectively activating the transport device of the coolant circuit comprises:
activating the transport device of the coolant circuit when the level of water in the water reservoir is below a predetermined minimum value; and
deactivating the transport device of the coolant circuit when the level of water in the water reservoir is equal to or greater than the predetermined minimum value.

12. The method as claimed in claim 1, wherein selectively activating the transport device of the coolant circuit comprises:
deactivating the transport device of the coolant circuit when the level of water in the water reservoir is above a predetermined minimum value and the at least one fuel cell is operated in a low load region; and
activating the transport device of the coolant circuit when the level of water in the water reservoir is below the predetermined minimum value and the at least one fuel cell is operated in the low load region.

13. The method as claimed in claim 1, wherein cooling the at least one fuel cell with water from the water reservoir is performed without activating the transport device of the coolant circuit until the level of water in the water reservoir is less than a predetermined minimum value.

14. The method as claimed in claim 1, wherein
the transport device of the coolant circuit is activated when the level of water in the water reservoir is less than a predetermined minimum value, and
coolant is transported to the first heat exchanger such that the level of water in the water reservoir is increased beyond the predetermined minimum value while simultaneously cooling the at least one fuel cell using at least some of the water from the water reservoir.

15. A method for operating a fuel cell system of a motor vehicle comprising at least one fuel cell, a water circuit including a first heat exchanger, a water reservoir, a first conduit to transport water from the first heat exchanger to the at least one fuel cell and a second conduit to transport cathode waste gas from the at least one fuel cell to the first heat exchanger, the motor vehicle further comprising a coolant circuit including a second heat exchanger and a transport device to circulate a coolant between the second heat exchanger and the first heat exchanger, the method comprising:
condensing, by the first heat exchanger, water from the cathode waste gas of the at least one fuel cell, the water being condensed by cooling provided by the coolant of the coolant circuit;
storing water condensed by the first heat exchanger in the water reservoir;
cooling the at least one fuel cell with water from the water reservoir, the water being transported from the water reservoir to the at least one fuel cell by the first conduit; and
selectively activating the transport device of the coolant circuit to selectively transport the coolant to feed the first heat exchanger, depending on a level of water in the water reservoir, wherein
when the motor vehicle is in a transient operating state in which power of the motor vehicle is being increased, the at least one fuel cell is cooled with water from the water reservoir without the transport device of the coolant circuit transporting the coolant to feed the first heat exchanger.

* * * * *